March 3, 1970  E. F. PETERSON  3,498,651

DRIVING CONNECTION

Filed Feb. 3, 1969

INVENTOR.
E. F. PETERSON

United States Patent Office 3,498,651
Patented Mar. 3, 1970

3,498,651
DRIVING CONNECTION
Edwin F. Peterson, 119 Main St.,
Neponset, Ill. 61345
Filed Feb. 3, 1969, Ser. No. 796,114
Int. Cl. F16d *1/06;* B60b *27/06;* F16b *7/00*
U.S. Cl. 287—53           1 Claim

ABSTRACT OF THE DISCLOSURE

A driving connection between a shaft and a member keyed thereto for rotation therewith is improved by the provision of shaft-contained snubbing means acting to prevent or restrict relative angular movement between the member and shaft so as to prolong the life of the shaft-to-member key.

BACKGROUND OF THE INVENTION

Conventional shaft-to-drive member (or driven member) key means are found to deteriorate rapidly when substantial torque reversals occur, as in starting and stopping, quick acceleration, elliptical orbiting etc., unless exceptional durability is built in at the expense of costly design and materials. Many environments cannot tolerate the added expense, with the result that destruction of the key means is quite frequent. Often, simple replacement of the key is not the answer, because the keyways become distorted, the key is fragmented and severe galling of the parts results. These disadvantages are found especially in the field of rotary vibrators where a heavy weight, eccentrically mounted either directly to a motor shaft or by way of a sleeve keyed to the motor shaft, causes or accentuates the aforesaid severe torque reversals and starting and stopping frequencies.

SUMMARY OF THE INVENTION

The present invention overcomes these problems by the use of snubbing or damping means used as an adjunct to the key means for eliminating or minimizing relative angular movement between the shaft and the member keyed thereto. Broadly, the novel means is contained within the shaft and includes means for converting an axially compressive force into a radially outwardly expanding force so as to add a frictional connection between the shaft and member. In preferred embodiments, the shaft has an axial bore which carries compression means acting against a snubbing element carried in an intersecting radial bore, the compression means being axially operative to displace the snubbing element radially into engagement with the interior portion of the member opening that fits the shaft. The snubbing element may be variously composed of two opposed members between which the compression means acts in wedge-like fashion or as a single element of elastomer material that is deformable by the compression means so as to expand or be radially outwardly displaced, and in either of these forms the member-engaging ends of the snubbing element (or the entire snubbing element) may include high-friction material to improve the frictional engagement.

DESCRIPTION OF THE PREFERRED EMBODIMENTS

Figure 1:
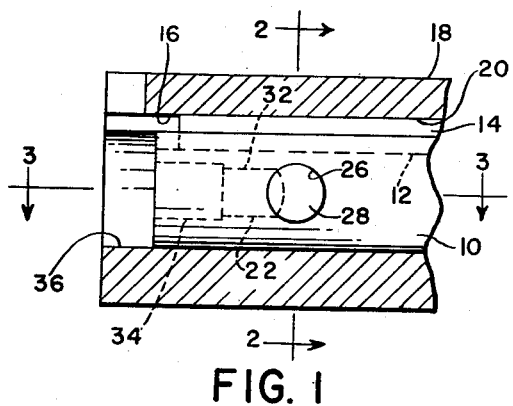
FIGURE 1 is a longitudinal sectional view of a typical shaft-to-member drive connection and incorporating one form of the invention.
Figure 2:
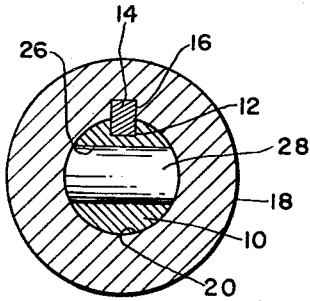
FIGURE 2 is a section on the line 2—2 of FIGURE 1.
Figure 3:
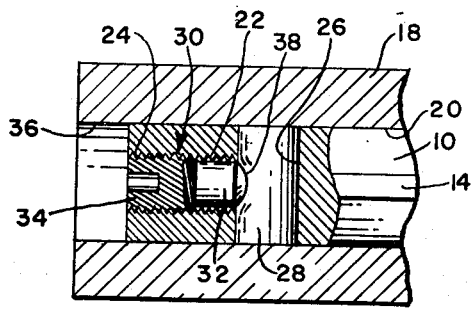
FIGURE 3 is a section on the line 3—3 of FIGURE 1.

In FIGURES 1-3, a shaft 10 is shown as having a typical keyway 12 in which is received a key 14 to mate with a keyway 16 in a driving or driven member 18, the latter being typically tubular or sleeve-like so as to have an axial opening 20 fitting the shaft and representing an interior cylindrical surface to the outer cylindrical surface of the shaft. This may be regarded as conventional construction to which the invention is an adjunct.

The shaft has an axial blind bore 22 opening at its outer end as an interiorly threaded bore portion 24, the inner or blind end of the bore here being effected by a T intersection with a cross opening 26, here a diametrical radial bore having opposed bore portions. A snubbing element 28 is carried in the cross bore or opening 26 and is acted on by axial compression means 30, the effect, broadly, being that axial forces imposed inwardly (to the right as seen in FIGS. 1 and 3) cause radially outward displacement of opposite portions of the element 28 into engagement respectively with diametrically opposed portions of the interior surface 20 of the member 18.

In FIGURES 1-3, the element 28 is composed of suitable elastomer material, which is of course deformable under pressure. The compression means includes a compression member 32 and an externally threaded part 34 threadably fitting the internally threaded bore portion 24, whereby tightening of the part 34 acts axially through the member or pin 32 to deform the center part of the element 28 and thereby to cause its outer end parts to respectively engage the interior of the member 18. It is found that rather high forces can be developed by this combination. The ready access to the threaded part 34 through the open end of the shaft, as at 36, enables easy tightening and loosening of the part. The threaded part 34 may be a conventional Allen head screw.

Figure 6:
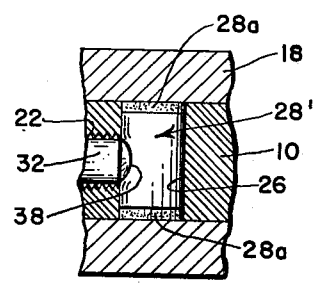
FIGURE 6 similarly shows another modification.

By way of further improvement in the gripping action of opposite end portions of the element 28 (or of one end if the bore 26 is simply radial rather than diametrical), parts of high-friction material, such as phenolic-asbestos as used in brake linings and the like, may be bonded to the element ends, or otherwise disposed, as shown at 28a in FIGURE 6, the composite element being denoted at 28′. Also, the inner end of the pin or rod 32 may be shaped to improve its element-deforming action, as shown at 38, which is here the section of a sphere.

Figure 4:
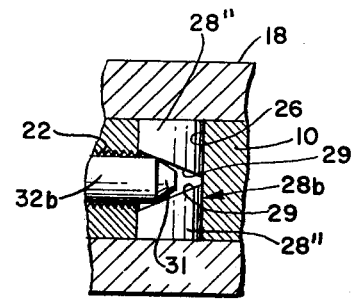
FIGURE 4 is a fragmentary section similar to FIGURE 3 but showing a modified form of the invention.

FIGURE 4 illustrates another modification in which an element 28a is made up of two separate parts 28″, facing each other in spaced apart relation at the intersection of the bores 22 and 26 as cam faces 29 between which enters the wedge-shaped end 31 of a modified form of compression member or pin 32b, it being understood that the pin 32b is backed up by a threaded part such as that previously described at 34. Here, as in other forms of the invention, the compression members, as at 32 and 32b, may be separate from the part 34 so as to prevent rotation of one part from being imparted to the other. In FIGURE 4, as the cam means afforded by the wedge 31 is forced between the faces 29 of the element parts or portions 28″, these portions are displaced radially oppositely outwardly into engagement with the interior 20 of the member 18. On the basis of what is disclosed in FIGURE 6, it follows that the element portions 28″ may be augmented by high-friction material or each portion may be wholly constructed of such material.

Figure 5:
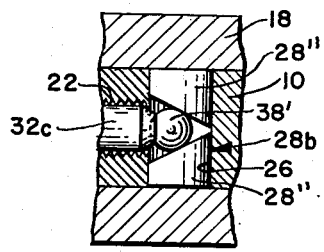
FIGURE 5 is a similar view showing another modification.

FIGURE 5 shows a further modification in which the element 28b, constructed as described above, is acted upon by a different form of cam or wedge means, here a ball 38' separate from and acted upon a modified form of compression member or rod 32c, which is in turn acted upon by a threaded part such as that at 34. It will be clear that the ball type of means may be substituted in FIGURES 1–3 or 6 as well as in FIGURE 4 and that other specific characteristics of the modifications may be interchanged among each other.

During installation, the snubbing means parts are relaxed so as to enable easy connection among the shaft, member and key. After this much of the assembly has been achieved, the snubbing means may be applied and the screw 34 tightened to the desired degree. Because of the easy access to the screw, increased tightening may be effected after operation of the drive assembly to compensate for errors in initial adjustment etc. The invention affords a simple and inexpensive construction and avoids the use of high-cost materials.

I claim:

1. A driving connection including a shaft, a member having an axial opening fitting the shaft and a single key means interconnecting the shaft and member for rotation in unison, characterized in that the shaft has a diametrical substantially cylindrical through bore spaced axially from one end of the shaft and having an axis transverse to but spaced from the key means and an axial bore having one end intersecting and terminating at the diametrical bore and the other end opening at said end of the shaft with a coaxially internally threaded bore portion, a single block of elastomeric material filling the cross bore and having opposite ends engaging diametrically opposed interior surface portions of the member, and adjustable compressive means carried in the axial bore and at one end engaging the side of said block intermediate the ends thereof and at its other end having an externally threaded part screwed into said threaded bore portion for causing said compressive means to displace opposite end portions of said block diametrically oppositely outwardly into tight engagement with said member surface portions.

References Cited

UNITED STATES PATENTS

| 65,420 | 6/1867 | Olmsted. | |
|---|---|---|---|
| 1,611,912 | 12/1926 | Hleb. | |
| 2,410,493 | 11/1946 | Gideon | 279—2 |
| 2,650,317 | 8/1953 | Maclay et al. | |
| 2,651,531 | 9/1953 | Smith | 287—53 |
| 2,797,602 | 7/1957 | Atherholt et al. | |
| 3,115,798 | 12/1963 | Donaway | 279—2 |
| 3,319,209 | 5/1967 | Reyenga | 287—124 |

FOREIGN PATENTS 274,954    7/1927    Great Britain.

DAVID J. WILLIAMOWSKY, Primary Examiner

A. V. KUNDRAT, Assistant Examiner

U.S. Cl. X.R.

287—124